(12) United States Patent
Yashiro et al.

(10) Patent No.: US 8,144,943 B2
(45) Date of Patent: Mar. 27, 2012

(54) APPARATUS AND METHOD FOR DETECTING SPECIFIC SUBJECT IN IMAGE

(75) Inventors: Satoshi Yashiro, Yokohama (JP); Kotaro Yano, Tokyo (JP); Yumi Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 11/781,795

(22) Filed: Jul. 23, 2007

(65) Prior Publication Data

US 2008/0025609 A1 Jan. 31, 2008

(30) Foreign Application Priority Data

Jul. 26, 2006 (JP) ................................. 2006-203374

(51) Int. Cl.
*G06K 9/00* (2006.01)
*G06K 9/32* (2006.01)
(52) U.S. Cl. ......... 382/118; 382/299; 382/298; 382/115
(58) Field of Classification Search .................. 382/118, 382/155, 299
See application file for complete search history.

(56) References Cited

U.S. PATENT DOCUMENTS

| | | | |
|---|---|---|---|
| 6,944,319 B1 * | 9/2005 | Huang et al. | 382/118 |
| 7,187,786 B2 * | 3/2007 | Kee | 382/118 |
| 7,324,671 B2 * | 1/2008 | Li et al. | 382/118 |
| 7,835,549 B2 * | 11/2010 | Kitamura et al. | 382/118 |
| 2006/0093224 A1 * | 5/2006 | Uchino | 382/232 |
| 2006/0222217 A1 * | 10/2006 | Kitamura et al. | 382/118 |

FOREIGN PATENT DOCUMENTS

| | | |
|---|---|---|
| JP | 2005-044330 A | 2/2005 |
| JP | 2005-284487 A | 10/2005 |
| JP | 2006-244385 A | 9/2006 |

OTHER PUBLICATIONS

Ming-Hsuan Yang, David J. Kriegman, Narendra Ahuja, Detecting Faces in Images: A Survey, IEEE Transactions on Pattern Analysis and Machine Intelligence, Jan. 2002, pp. 34-58, vol. 24, No. 1.
Henry A. Rowley, Shumeet Baluja, Takeo Kanade, Neural Network-Based Face Detection, IEEE Transactions on Pattern Analysis and Machine Intelligence, Jan. 1998, pp. 23-38, vol. 20, No. 1.
Paul Viola, Michael Jones, Rapid Object Detection Using a Boosted Cascade of Simple Features, Accepted Conference on Computer Vision and Pattern Recognition, 2001, pp. 1-9.

* cited by examiner

*Primary Examiner* — Bhavesh Mehta
*Assistant Examiner* — Utpal Shah
(74) *Attorney, Agent, or Firm* — Canon USA, Inc., IP Division

(57) ABSTRACT

A plurality of collation patterns having different resolutions are generated from an original collation pattern which includes a plurality of local regions. Subject reliabilities for individual local regions are calculated based on local features of the local regions in the collation patterns having different resolutions. In accordance with the subject reliabilities for individual local regions, it is determined that the original collation pattern includes a specific image of a subject.

12 Claims, 14 Drawing Sheets

APPARATUS AND METHOD FOR DETECTING SPECIFIC SUBJECT IN IMAGE

BACKGROUND OF THE INVENTION

1. Field of the Invention

The present invention relates to digital imaging apparatuses, such as digital still cameras and digital video cameras, and image processing using image processing software. More particularly, the present invention relates to an apparatus and a method for detecting a specific subject, such as a person, an animal, or an object, or a portion of the subject included in a still image or a moving image.

2. Related Background Art

An image processing method for automatically detecting a pattern of a specific subject in an image is very useful for determining a human face, for example. Such a method is applied in various fields, such as a communications conference, a man-machine interface, security, a monitoring system for tracing a human face, and image compression.

Various techniques for detecting a face in an image are disclosed in, for example, "Detecting Faces in Images: A Survey" IEEE TRANSACTIONS ON PATTERN ANALYSIS AND MACHINE INTELLIGENCE, VOL. 24, NO. 1, JANUARY 2002.

In the disclosed techniques, some specific features (e.g., eyes, mouth, and nose) and geometric positional relationship among the features are utilized for detecting a human face. Alternatively, a symmetrical feature of a human face, a feature of a human face color, template matching, and a neural network, for example, can be utilized for detecting a human face.

"Neural network-based face detection" IEEE TRANSACTIONS ON PATTERN ANALYSIS AND MACHINE INTELLIGENCE, VOL. 20, NO. 1, JANUARY 1998 discloses a method for detecting a face pattern in an image utilizing a neural network. The method for detecting the face pattern will be briefly described hereinafter.

Image data including an image of a human face to be detected is stored in a memory. Regions, each of which is to be checked whether a face image is included, are successively cut out from the stored image. The distribution of pixel values in the cutout region is used as an input for calculation using a neural network to obtain an output as a result of the calculation. Here, a weight and a threshold value of the neural network are obtained in advance with reference to a large number of face-image patterns and non-face-image patterns. For example, if the output of the neural network is greater than 0, it is determined that the region includes a face image, otherwise, it is determined that the region includes a non-face image.

Then, the cutout regions including image patterns, each of which is to be checked for whether a face image is included and each of which is an input of the neural network, are scanned in the horizontal direction for successive rows in the entire image, for example, as described in FIG. 6, whereby a face image is detected in the image. Furthermore, since it is preferable that any face images of various sizes are detected, the stored image is successively made smaller by a predetermined amount as shown in FIG. 6, and the scanning as described above is performed for detecting a face image.

"Rapid Object Detection using Boosted Cascade of Simple Features" Proceedings of the IEEE Conference on Computer Vision and Pattern Recognition (CVPR'01) also discloses object detection processing paying attention to rapid processing. In this document, AdaBoost algorithm is used and weak discriminators are effectively used in combination, whereby the accuracy of face detection is improved. In addition, each of the weak discriminators is configured by Haar-like rectangle features, and moreover, the rectangle features are calculated at high speed using an integral image. Furthermore, discriminators using features obtained by AdaBoost learning are connected with one another in series to configure a cascade face detector.

The cascade face detector immediately eliminates candidates of patterns which are apparently not determined as face images using a simple detector (that is, a detector which needs a small number of calculations) in a first stage. Thereafter, only for candidates other than the candidates which are apparently not determined as face images, the cascade face detector performs the determination as to whether the face image is included using a complicated detector (that is, a detector which needs a large number of calculations) having a higher discrimination capability in a second stage. Accordingly, it is not necessary to perform complicated determination for all candidates, and therefore, processing is performed rapidly.

In addition, since rectangle features obtained using a Haar-like filter are calculated using an integral image in a fixed calculation cost irrespective of an area of the image, it is not necessary to consider processing cost for selecting weak discriminators.

However, according to the method disclosed in the "Neural network-based face detection" document, face discrimination processing should be performed a large number of times on one image, and this leads to a problem of processing speed.

Furthermore, according to the method disclosed in the "Rapid Object Detection using Boosted Cascade of Simple Features" document, to configure a face detector having high accuracy, it is necessary to calculate more than 6000 rectangle features. Moreover, since rectangle features are obtained by detecting luminance contrasts in the vertical direction and the horizontal direction, if a subject to be discriminated has many features in the diagonal direction, the rectangle features are not calculated by the same method. Therefore, for example, a weak discriminator using features capable of detecting a luminance contrast in the diagonal direction should be provided.

In addition, when the weak discriminator is configured using a filter feature other than a Haar-like feature or other than a rectangle feature, the weak discriminator obtains a high degree of freedom, and therefore, accuracy as a single weak discriminator may be improved as needed. However, the integral image described above cannot be used and calculation cost is increased due to an area of a filter. Accordingly, an improvement in accuracy which is worthy of the increased calculation cost is not attained.

SUMMARY OF THE INVENTION

The present invention provides an apparatus and a method for effectively detecting an image of a specific subject with high accuracy.

According to one aspect, the present invention provides an image processing apparatus including a resolution conversion unit configured to convert a collation pattern into collation patterns having different resolutions, a subject reliability calculation unit configured to calculate, based on local features in a plurality of local regions in the collation patterns having different resolutions and subject reliabilities for the individual local regions, and a discrimination unit configured to perform discrimination processing by determining whether the collation pattern includes an image of a specific subject in accordance with the subject reliabilities of the local regions.

Other features and advantages shall be apparent to those skilled in the art from the description of exemplary embodiments of the present invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

Exemplary embodiments of the present invention will now be described in detail with reference to the accompanying drawings.

Figure 1:
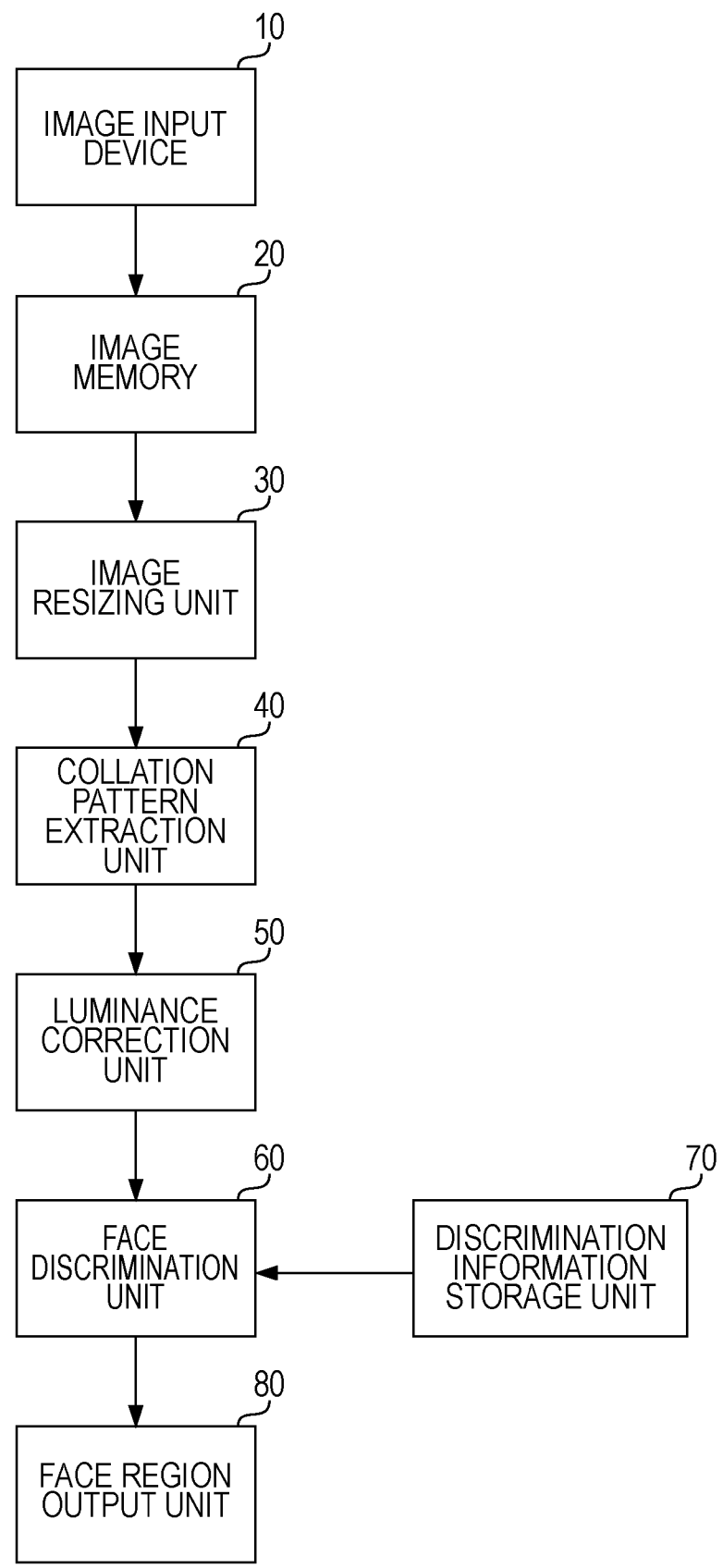
FIG. 1 is a block diagram illustrating a functional configuration of an image processing apparatus according to a first exemplary embodiment of the present invention.

FIG. 1 is a block diagram illustrating a functional configuration of an image processing apparatus according to a first embodiment.

An image input device 10 is a device, such as a digital still camera, for capturing and inputting an image. Alternatively the image input device 10 may be an interface device of a computer system for reading an image from a recording medium which stores digital image data.

An image memory 20 is configured as a RAM (random access memory) and temporarily stores image data supplied from the image input device 10. An image resizing unit 30 resizes an image stored in the image memory 20 to be small using a predetermined reduction ratio and outputs the resized image.

A collation pattern extraction unit 40 extracts a predetermined region from the image resized using the image resizing unit 30 as a pattern to be collated (hereinafter referred to as a "collation pattern"). A luminance correction unit 50 corrects luminance distribution of the collation pattern extracted using the collation pattern extraction unit 40. A face discrimination unit 60 determines whether the collation pattern, which was extracted using the collation pattern extraction unit 40 and was corrected using the luminance correction unit 50, is a face pattern or a non-face pattern.

A discrimination information storage unit 70 stores information about a local region in which subject reliability thereof (here, "subject reliability" indicates the degree of reliability at which an image of a specific subject belongs to a local region) is calculated, information about a filter, a weight, and a threshold value of the subject reliability. A face region output unit 80 outputs a region of a collation pattern which is determined as a face pattern using the face discrimination unit 60. The units described above are controlled by a controller (not shown).

Figure 2:
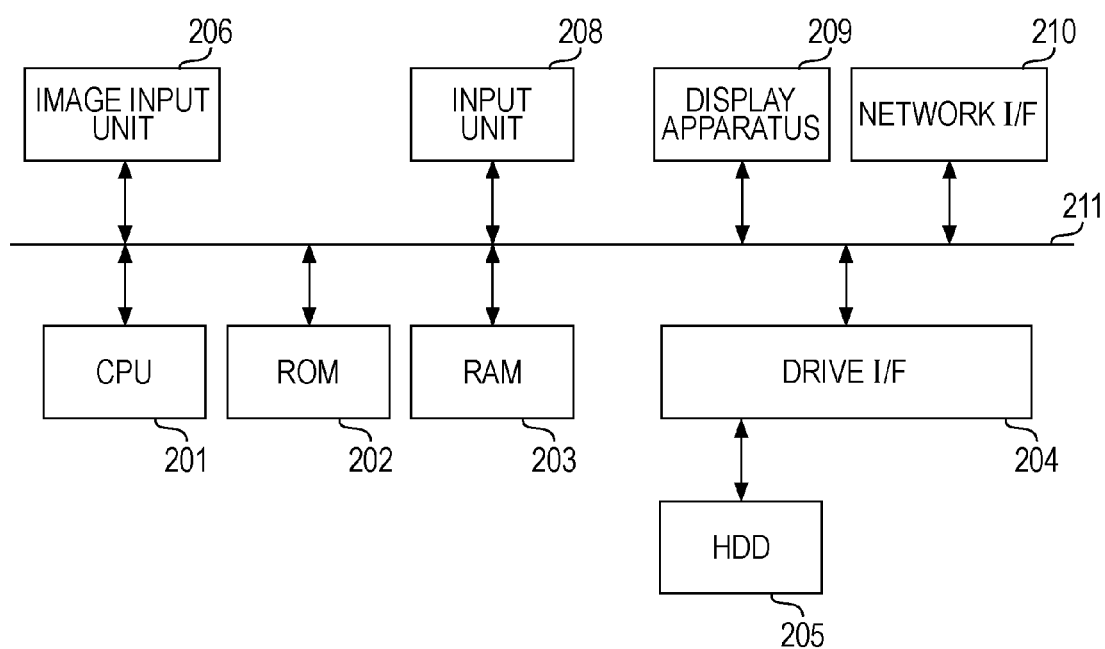
FIG. 2 is a block diagram illustrating a hardware configuration of the image processing apparatus according to the first embodiment.

FIG. 2 is a block diagram illustrating a hardware configuration of the image processing apparatus according to the first embodiment.

A CPU 201 executes programs stored in a ROM (read-only memory) 202 or a RAM 203 and controls every unit of the image processing apparatus. The ROM 202 stores programs necessary for controlling every unit of the image processing apparatus and fixed data. The RAM 203 serves as a work area and stores temporary data.

A drive I/F (interface) 204 implements an interface, such as an IDE (integrated drive electronics) or a SCSI (small computer system interface), connecting between the image processing apparatus and an external storage. An HDD (hard disk drive) 205 is connected to the drive I/F 204 and stores programs to be executed for extracting an image or a pattern and stores a sample pattern used to discriminate between a face pattern and non-face pattern.

An image input unit 206 receives an image supplied from an apparatus such as a digital still camera or a scanner. An input unit 208 includes a keyboard and a mouse and is used by an operator for inputting instructions. A display apparatus 209 includes a cathode-ray tube or a liquid crystal display, for example. The display apparatus 209 is used to display an image including an image of a subject and display a result of discrimination of a face region in the image.

A network I/F (interface) 210 is configured by a modem or a LAN (local area network), for example, and used to connect the image processing apparatus to a network such as the Internet or an intranet. The units described above are connected to each other via a bus 211 to transmit and receive data.

Figure 5:
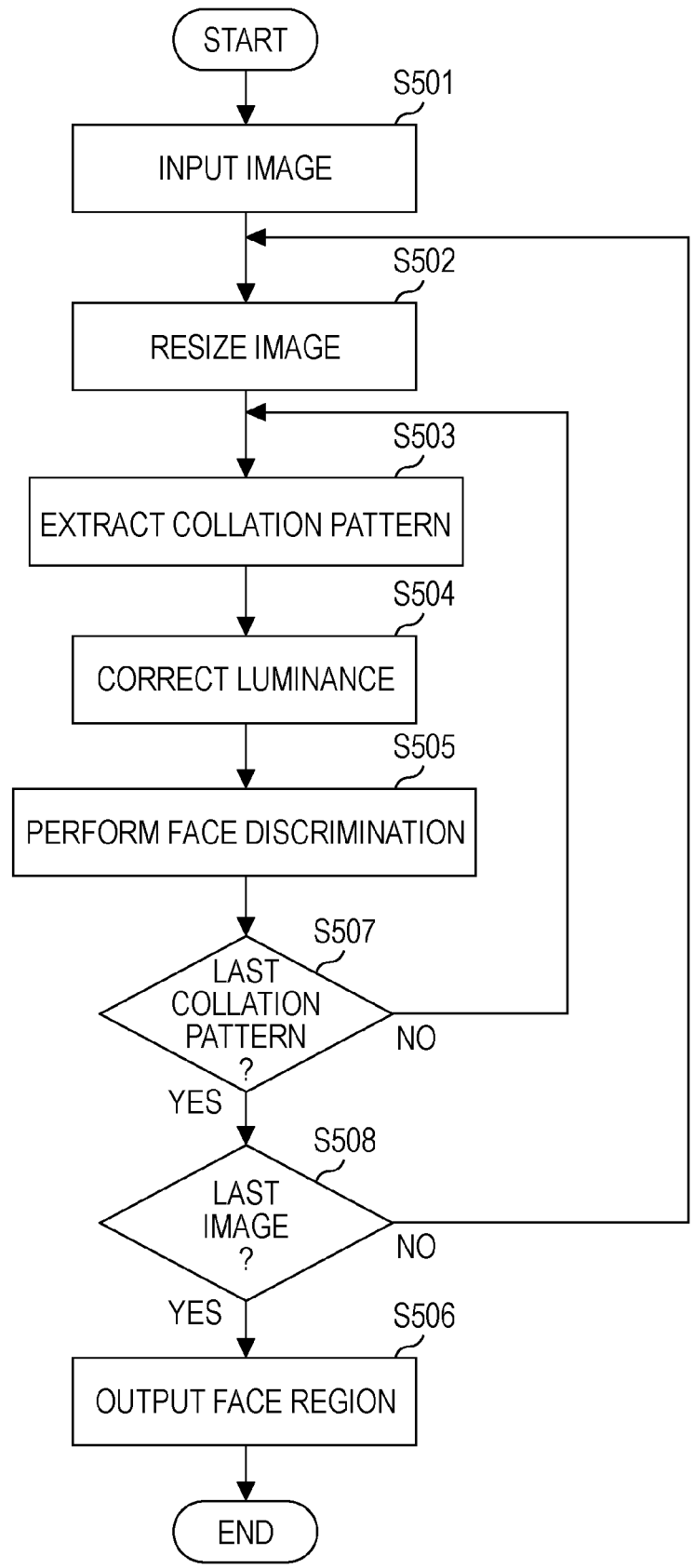
FIG. 5 is a flowchart illustrating a processing flow of face detection processing according to the first embodiment.
Figure 9:
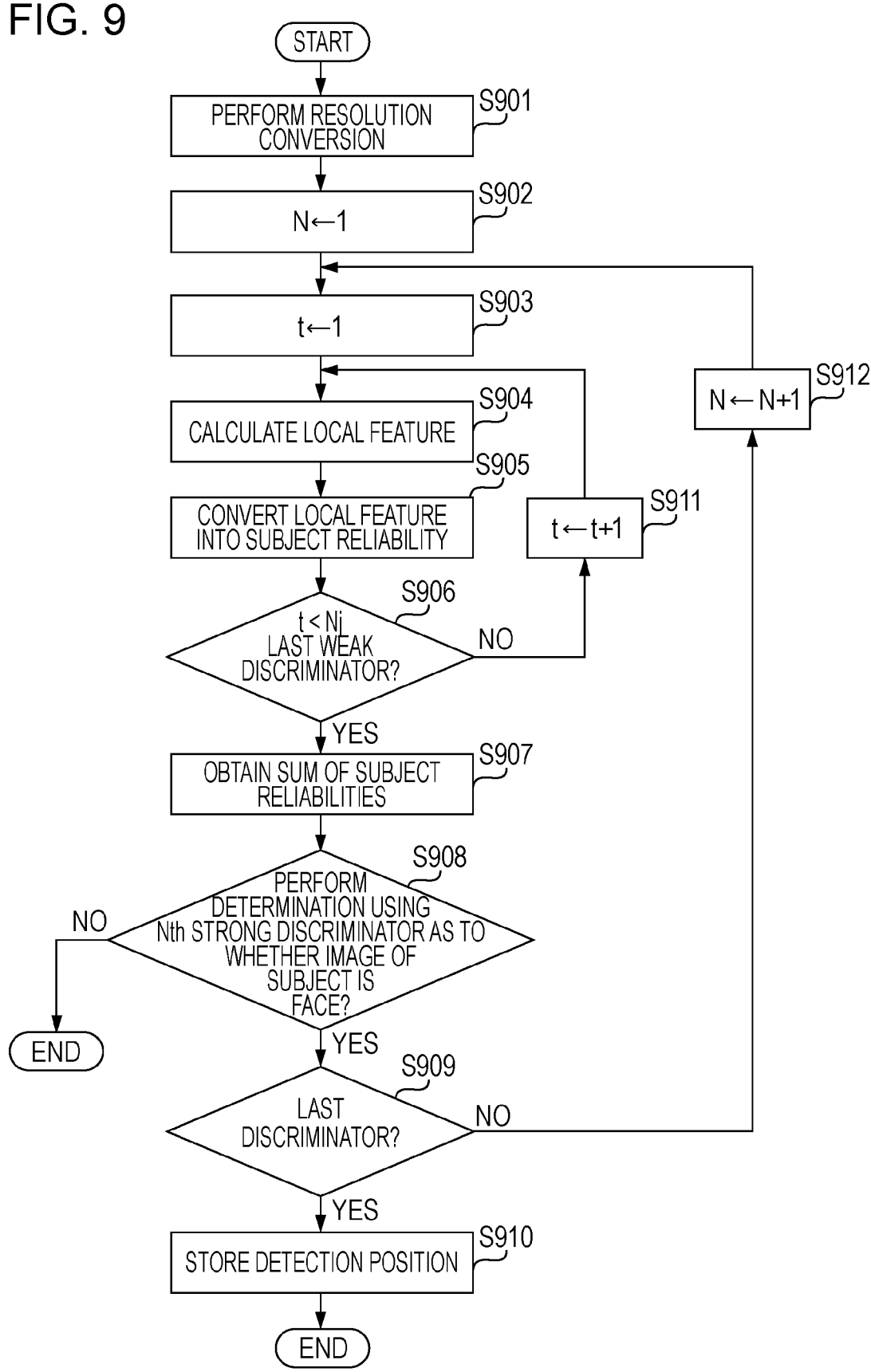
FIG. 9 is a flowchart illustrating a processing flow of face discrimination processing according to the first embodiment.

Functions of the image processing apparatus are implemented as application programs operated using a computer in which an operating system is installed. Programs, which will be described later with reference to the flowcharts illustrated in FIGS. 5 and 9, are stored in the HDD 205 and are executed after being read from the HDD 205 to the RAM 203.

Figure 3:
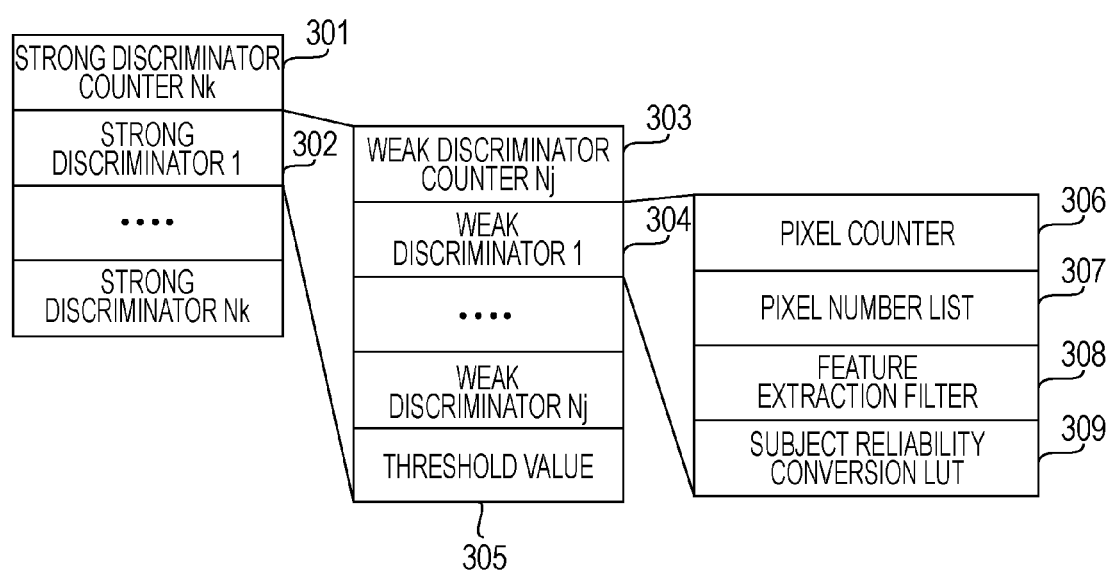
FIG. 3 is a diagram illustrating a data configuration of discriminator information according to the first embodiment.

Referring now to FIG. 3, discriminator information stored in the discrimination information storage unit 70 according to the present embodiment will be described.

A plurality of discriminators, each of which is called a strong discriminator 302, are connected in series to extract a face pattern. That is, a local region is determined as a face pattern only when all the discriminators 302 have determined that the extracted region includes a face pattern. A strong discriminator counter 301 stores the number of the strong discriminators 302.

Each of the strong discriminators 302 includes a weak discriminator counter 303, weak discriminators 304, and a threshold value 305. The number of weak discriminators 304 is stored in the weak discriminator counter 303.

Each of the weak discriminators 304 includes a pixel counter 306 which stores the number of pixels constituting a local region, a pixel number list 307 which is a list of numbers assigned to pixels constituting the local region, a feature extraction filter 308 which is formed as a matrix of a plurality of rows corresponding to the number of pixels constituting the local region stored in the pixel counter 306 and one column, and a subject reliability conversion look-up table 309 which is a table used for converting local features into subject reliabilities.

Figure 4:
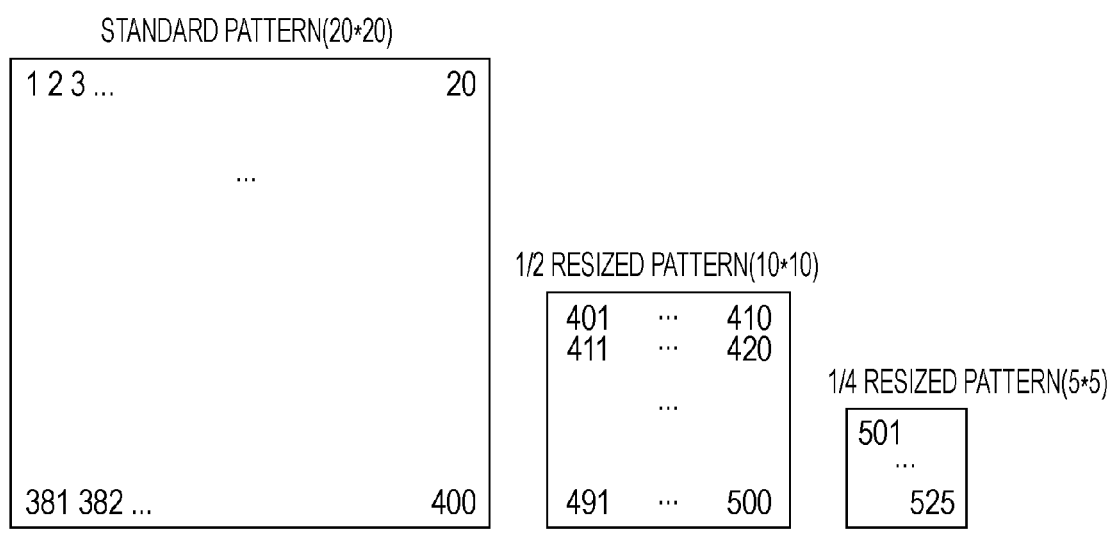
FIG. 4 is a diagram supplementarily illustrating the data configuration of the discriminator information according to the first embodiment.

FIG. 4 is a diagram supplementarily illustrating the data configuration of the discriminator information according to the present embodiment. As illustrated in FIG. 4, in the present embodiment, an original face pattern is defined as a pattern including images of eyes and a mouth and having a pixel matrix of 20 rows and 20 columns. The original pattern having the pixel matrix of 20 rows and 20 columns is resized to half the original size so that a first pattern having a pixel matrix of 10 rows and 10 columns is generated. In addition, the original pattern having the pixel matrix of 20 rows and 20 columns is resized to quarter the original size so that a second pattern having a pixel matrix of 5 rows and 5 columns is generated. Pixels included in the original face pattern, the first face pattern, and the second pattern are assigned pixel numbers from 1 to 400, from 401 to 500, and from 501 to 525, respectively.

FIG. 5 is a flowchart illustrating a processing flow of face detection processing according to the present embodiment.

In step S501, the image input device 10 captures a desired image, and image data representing the image is supplied to the image memory 20. The supplied image data has, for example, a pixel matrix including eight-bit pixels and has R, G, and B components. If the image data have been compressed by, for example, a JPEG method, the image data is decompressed by a corresponding decompressing method to obtain image data of RGB pixels. Furthermore, in the present embodiment, RGB data is converted into luminance data to obtain luminance image data and the luminance image data is stored in the image memory 20. In this case, the processing from S502 is applied to the luminance image data. In a case where YCrCb data is input as image data, the Y component may serve as luminance data.

In step S502, the image resizing unit 30 reads the luminance image data from the image memory 20 and generates a luminance image resized using a predetermined reduction ratio. In the present embodiment, as with the "Neural network-based face detection" document, since face images of various sizes should be detected, the original luminance image is resized and this process is repeated to generate a plurality of sizes of luminance images and the detection is successively performed on resized images. For example, a plurality of images are generated by successively resizing an image by approximately 1/1.2 times and the generated images are subjected to detection processing, which is described below.

In step S503, the collation pattern extraction unit 40 extracts regions of a specific size from the resized luminance images as collation patterns. A process of the extraction is illustrated with reference to FIG. 6. Images which are resized using the image resizing unit 30 and each of which represents image data, are illustrated in column A of FIG. 6. Rectangular regions of a specific size are cut out from the resized luminance images.

Figure 6:
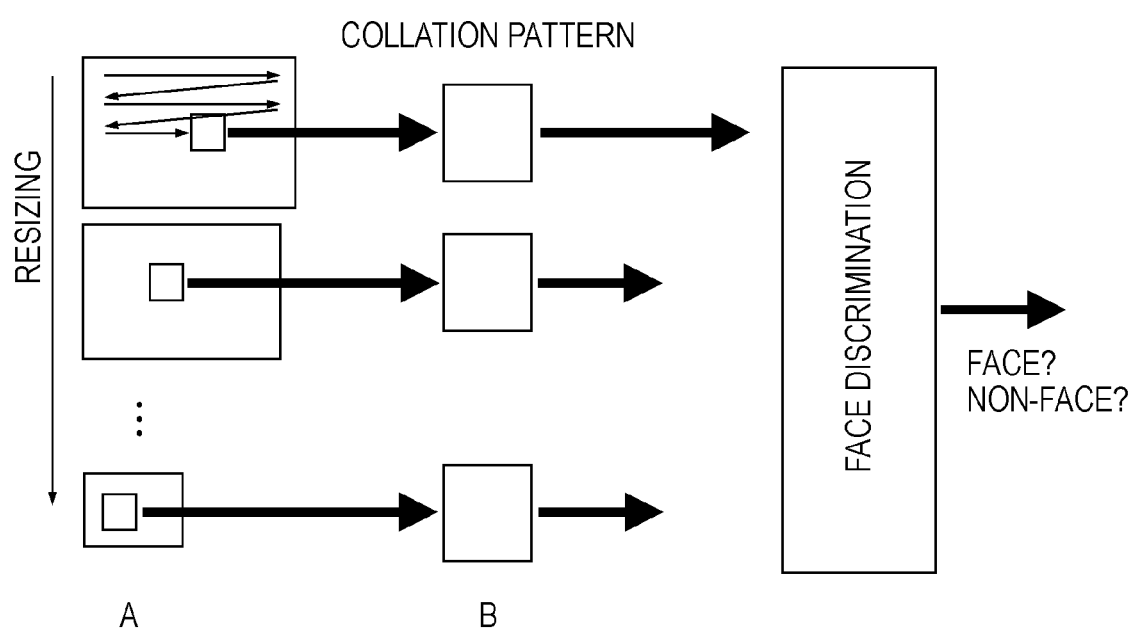
FIG. 6 is a diagram illustrating processing for extracting a collation pattern according to the first embodiment.

Collation patterns illustrated in column B of FIG. 6 are generated while each of the resized luminance images is scanned in the horizontal direction successively for individual rows of pixels included therein. As illustrated in FIG. 6, when a collation pattern is cut out from a luminance image resized by a comparatively large reduction ratio and is used for face discrimination processing, the collation pattern to be detected is large with respect to the resized luminance image.

In step S504, the luminance correction unit 50 normalizes the luminance of the region extracted using the collation pattern extraction unit 40 in accordance with luminance distribution in the region. For example, luminance correction using histogram flattening is performed. This normalization is performed due to the following reason. Since luminance distribution of a pattern of a subject depends on the condition of light at a time of capturing the subject, deterioration in accuracy at a time of subject collation processing should be prevented. In place of the luminance correction using histogram flattening, luminance correction can be achieved by setting an average luminance and distribution of the luminance to predetermined values.

In step S505, the face discrimination unit 60 determines whether the collation pattern, which was extracted using the collation pattern extraction unit 40 and which was corrected using the luminance correction unit 50, is a face pattern or a non-face pattern.

In step S507, the process proceeds to step S508 if the extracted collation pattern is the last one, otherwise the process returns to step S503 to extract the next collation pattern. The processes from steps S503 to S505 are repeatedly performed with predetermined steps as illustrated in FIG. 6 on the resized luminance images which are output from the image resizing unit 30. Furthermore, in step S502, resizing processing operations are successively performed for generating the images of different reduction ratios. In step S508, the process proceeds to step S506 if the processed image is the last one generated in step S502, otherwise the process returns to step S502 to process the next image so that steps S503 to S505 may be performed on each of the generated images.

In step S506, the face region output unit 80 outputs the rectangular region, which is extracted using the collation pattern extraction unit 40 and which is determined as a face pattern using the face discrimination unit 60, as a face region.

Figure 14:
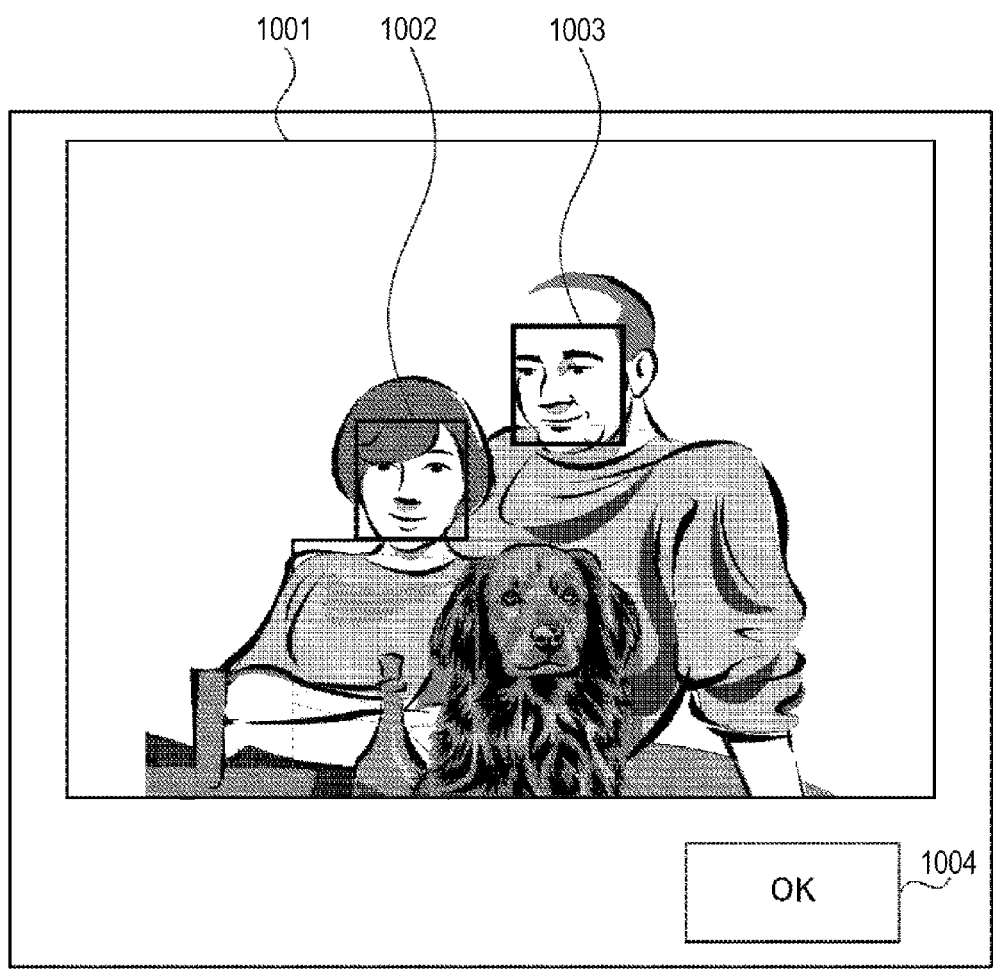
FIG. 14 shows an image displayed using a user interface unit according to the first embodiment.

FIG. 14 illustrates an example of an image being displayed on the display apparatus 209. Results of the face detection processing operations are shown as rectangular regions on an input image 1001. Face patterns 1002 and 1003 are regions extracted using a pattern extraction unit 40 and frames indicating the regions represent positions and sizes of the face patterns 1002 and 1003. A button 1004 is used to terminate a process of the face region output unit 80.

The face discrimination processing performed using the face discrimination unit 60 will now be described in detail.

Figure 11:
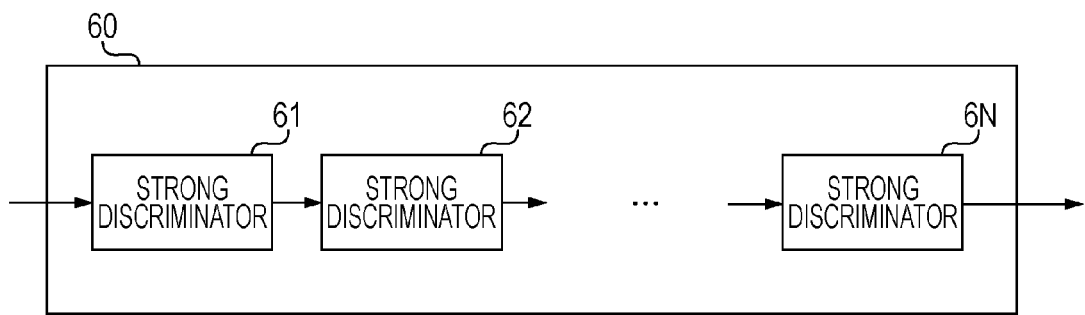
FIG. 11 is a block diagram illustrating a functional configuration of a face discrimination unit according to the first embodiment.

FIG. 11 illustrates a functional configuration of the face discrimination unit 60. As with the "Rapid Object Detection using Boosted Cascade of Simple Features" document, strong discriminators obtained by a learning algorithm are connected in series to configure a cascade face detector. This configuration is suitable for practical use in terms of processing speed. That is, the face discrimination unit 60 includes the number N of strong discriminators 61 to 6N connected in series.

Figure 12:
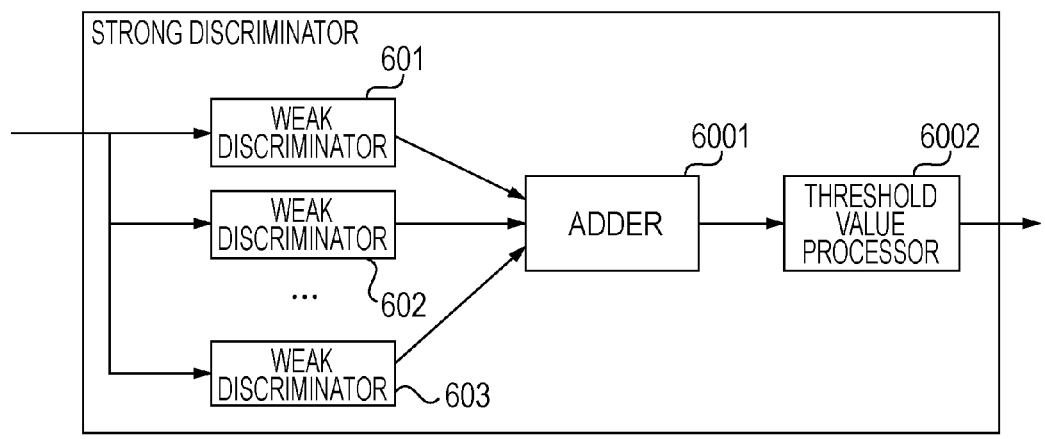
FIG. 12 is a block diagram illustrating a configuration of a strong discriminator according to the first embodiment.
Figure 13:
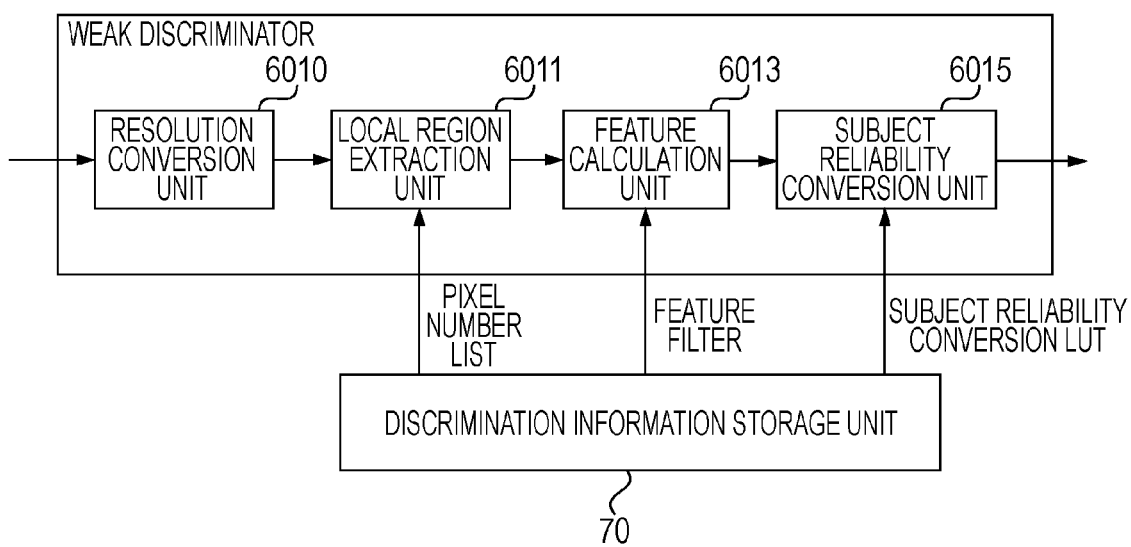
FIG. 13 is a block diagram illustrating a configuration of a weak discriminator in detail according to the first embodiment.

FIG. 12 illustrates a configuration of each of the strong discriminators having weak discriminators 601, 602, and 603 therein. Furthermore, FIG. 13 illustrates a configuration of each of the weak discriminators in detail.

FIG. 9 is a flowchart illustrating a processing procedure performed using the face discrimination unit 60.

In step S901, a resolution conversion unit 6010 generates a half-sized face pattern of an original face pattern and a quarter-sized face pattern of the original face pattern. Although resolution is set to $1/2^n$ (where n is an integer) in the present embodiment, the resolution is not limited to this. Since a plurality of images are successively generated using the image resizing unit 30 to have resolutions differing from one another by 1/1.2 times, the images may be used to further generate face patterns having different resolutions. Even in this case, increase of processing cost is negligible. Since the plurality of images have different resolutions, the following advantages are attained: the positional relationship between parts of a face is effectively collated using an image having a low resolution; and features of the parts of the face are accurately collated using an image having a high resolution.

In step S902, a strong discriminator loop count N is initialized, and in step S903, a weak discriminator loop count t is initialized. In step S904, a feature calculation unit 6013 calculates a local feature. A local feature ut is calculated by formula (1):

$$U_{t,N} = \phi_{t,N}^T z_{t,N} \quad (1)$$

Here, the suffix "t,N" indicates a t-th weak discriminator in an N-th strong discriminator. Furthermore, "$U_{t,N}$" indicates a local feature, and $\phi_{t,N}$ indicates a value of the feature extraction filter 308. Moreover, "$z_{t,N}$" indicates a matrix of one column and a plurality of rows corresponding to the number of pixels having luminance of pixels as elements in a resized pattern or a pattern represented by the pixel number list 307 obtained using a local region extraction unit 6011.

In step S905, a subject reliability conversion unit 6015 converts the local feature $U_{t,N}$ into a subject reliability $H_{t,N}$ as illustrated in formula (2):

$$H_{t,N} = f_{t,N}(U_{t,N}) \quad (2)$$

Here, $f_{t,N}$ is used to convert $U_{t,N}$ into the subject reliability $H_{t,N}$ using the subject reliability conversion look-up table 309, and the value of $H_{t,N}$ is output from each of the weak discriminators.

Here, in cases where the local feature $U_{t,N}$ is greater than an upper limit value or is less than a lower limit value, the local feature $U_{t,N}$ is set to the upper limit value or the lower limit value, respectively. Thereafter, the subject reliability $H_{t,N}$ is obtained with reference to the subject reliability conversion look-up table 309.

In step S906, a determination is made whether all weak discriminators are processed. When the determination is negative, the weak discriminator loop count t is successively incremented in step S911, and the processes from steps S904 to S906 are repeated until a last weak discriminator is processed.

When the determination is affirmative in step S906, the process proceeds to step S907 where an adder 6001 calculates a sum H of the subject reliabilities $H_{t,N}$ using formula (3):

$$H = \Sigma_t H_{t,N} \quad (3)$$

In step S908, a threshold value processing unit 6002 compares, as illustrated in formula (4), the sum H obtained in step S907 with a threshold value $Th_N$.

$$H \geq Th_N \quad (4)$$

When the sum H is greater than or equal to the threshold value $Th_N$, it is determined that the local area includes a face image, otherwise the local area does not include a face image.

When the determination is negative in step S908, the process is terminated. Meanwhile, when the determination is affirmative, the process proceeds to step S909, where it is determined that a last strong discriminator is processed. When the determination is negative in step S909, the process proceeds to step S912 where the strong discriminator loop count N is incremented and steps S903 to S909 are repeated until the last strong discriminator is processed.

That is, only when all the strong discriminators have determined that the local region includes a face image, the process proceeds to step S910 where a position of a pattern of the face image is stored and the process is terminated.

A method for generating discrimination information will now be described. Since differences among the strong discriminators are merely sample patterns used for training, a method for generating discrimination information using one of the strong discriminators will be described as an example.

Figure 7:
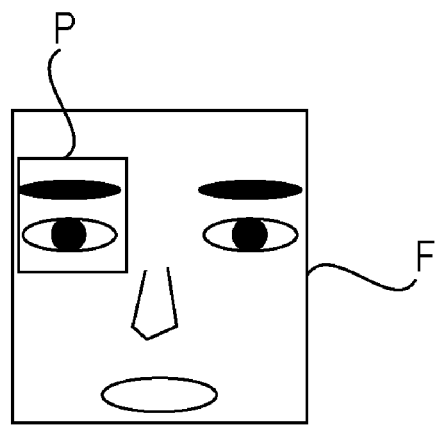
FIG. 7 is a diagram illustrating a local region of a face image according to the first embodiment.

In the present embodiment, a linear discriminant feature in a local region having a predetermined resolution, a predetermined size, and a predetermined form in a collation pattern is used as a local feature. For example, as illustrated in FIG. 7, when it is assumed that a collation pattern F is a luminance pattern including 20×20 pixels, a square portion including 5×5 pixels in the collation pattern F is set to a local region P. In this case, when such local regions P are set in all over the collation pattern F, 256 local regions are obtained.

Figure 8:
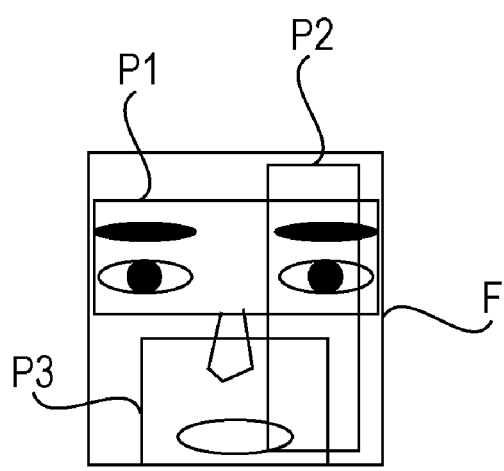
FIG. 8 is a diagram illustrating the local region of the face image according to the first embodiment.

Note that, as indicated by P1, P2, and P3 illustrated in FIG. 8, a combination of rectangular regions which have a horizontally long shape and a rectangular region which has vertically long shape may be used, and any combination of regions having various shapes and sizes such as an oval region and any other regions may be used. Alternatively, an original collation pattern is resized to be small several times to generate various resized collation patterns having low resolutions different from one another, and local regions in the resized collation patterns may be used in combination. Furthermore, a plurality of regions or pixels separate from one another may be used.

In addition to luminance values of pixels, one of color saturation, hue, and R component, G component, and B component in RGB color space, or a combination thereof may be used.

As a local feature, among collation patterns, a plurality of face patterns and non-face patterns are used as samples, and a value of the feature extraction filter 308 is generated based on a linear discriminant for each of the local features. An example of a known linear discriminant method is Fisher's linear discriminant method. In the local regions, for example, when an average and a variance of the samples of face patterns are set to $(\mu_O, \sigma_O^2)$, and an average and a variance of the samples of non-face patterns are set to $(\mu_N, \sigma_N^2)$, a value $\phi$ of the feature extraction filter 308 is obtained as illustrated in formula (5).

$$\phi = \mathrm{argmax}\{(\mu_O - \mu_N)^2 / (\sigma_O^2 + \sigma_N^2)\} \quad (5)$$

Note that "argmax" means that a parameter for which a value in braces attains its maximum value is obtained. That is, the feature extraction filter 308 $\phi$ is obtained by solving an eigen equation.

Although a value obtained using Fisher's linear discriminant function is used as a value of the feature extraction filter 308, a value obtained using a linear discriminant function by a linear support vector machine may be used as the value of the feature extraction filter 308. Alternatively, a value obtained using maximum rejection classifier (MRC) which is disclosed in Pattern Recognition Letters 23(2002), "Rejection based classifier for face detection", Elad et al. may be used as the value of the feature extraction filter 308. Note that a value used as the value of the feature extraction filter 308 is not limited to a value obtained using a linear discriminant function, and alternatively, a value obtained using a nonlinear discriminant function realized by a neural network may be used as the value of the feature extraction filter 308.

Each of the local regions is stored as a pixel count in the pixel counter 306 and the pixel number list 307. Each of the values of the feature extraction filter 308 is stored as a pixel weight of a corresponding one of the pixels.

Figure 10:
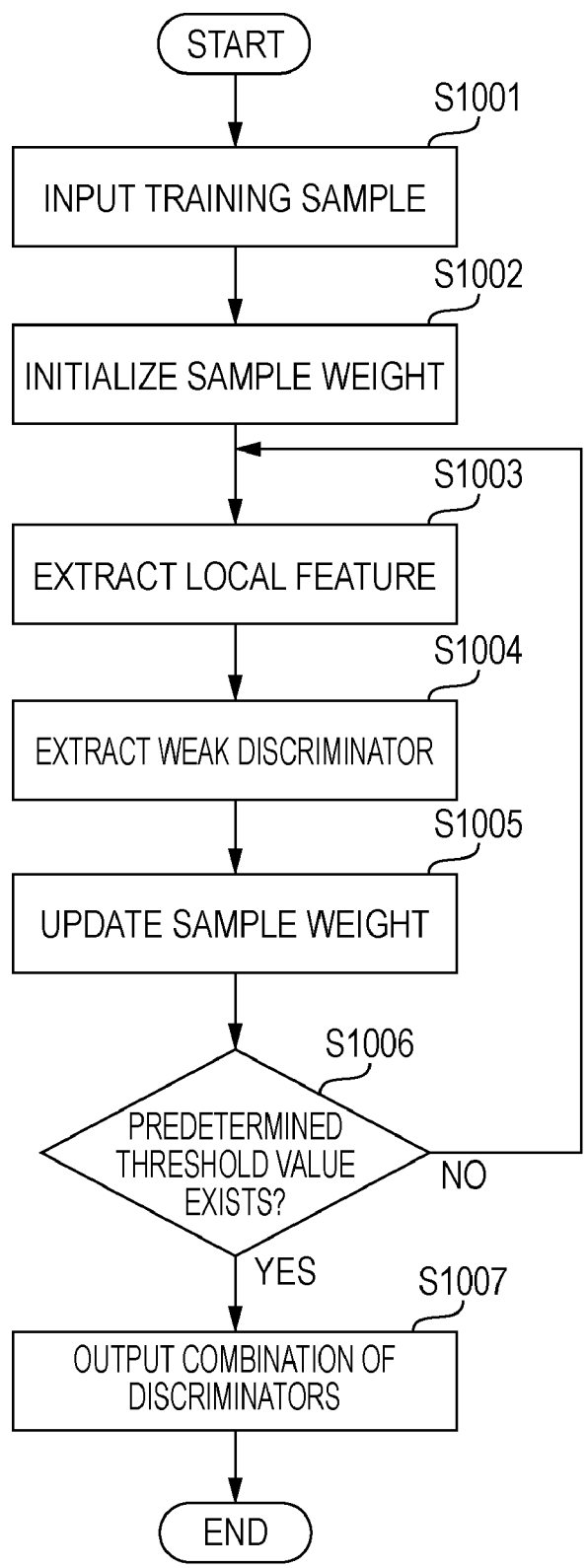
FIG. 10 is a flowchart illustrating a procedure for generating discrimination information according to the first embodiment.

Next, a method for selecting, among the local features, local features which are effectively used in combination for discrimination of a pattern. Note that the method employs an algorithm based on boosting learning designed for improvement of a performance by first extracting, among discrimination features, a feature which is the most effectively used to distinguish a pattern (this capability is referred to as "discrimination capability" hereinafter), and then extracting other features successively as auxiliary features to distinguish the pattern with high accuracy. FIG. 10 illustrates the algorithm of the method.

In step S1001, samples used for learning are input. In the present embodiment, collation patterns for a face pattern and a non-face pattern are used as the samples. Assuming that a feature vector of one of the samples is set as $x_i$, when a collation pattern corresponds to a luminance pattern having a pixel matrix of 20×20 pixels, a feature vector $x_i$ has 400 pieces of luminance data, and therefore, a feature vector $x_i$ is a 400-dimensional feature vector. Furthermore, it is assumed that the class in which the samples belong is set as $y_i$, and it is determined whether the pattern is a face pattern. When it is determined that the pattern is a face pattern, 1 is set to $y_i$ whereas when it is determined that the pattern is a non-face pattern, −1 is set to $y_i$. Here, i denotes a sample number and is changed from 1 to N, where N is a total sample number.

In step S1002, weights of the samples are initialized to be uniform. That is, weights $d_i$ of the samples are initialized as follows: $d_i=1/N$.

In step S1003, the samples and sample weights are used to extract local features. Note that each of the local features to be obtained here has a value $\phi$ of a feature extraction filter 308 generated using a linear discriminant for each of the local regions in the collation pattern as described above. However, here, a plurality of values $\phi_j$ (j=1 to M: where M corresponds to the number of defined local regions) of feature extraction filter 308s are extracted for the defined local regions. Furthermore, values which are weighted taking sample weights into consideration are used to obtain an average and a variance of the face-pattern samples or non-face pattern samples which are used when the values of the feature extraction filter 308s are obtained.

In step S1004, discrimination capabilities of the local features are evaluated using the samples, and a local feature having an excellent discrimination capability is extracted as a weak discriminator. That is, using a value $\phi_j$ of the feature extraction filter 308 of each of the local features, a local feature $u_{ij}$ is calculated using a luminance value ($z_i$) of a pixel corresponding to each of the local regions in a sample xi as illustrated in formula (6) (T denotes transposition):

$$u_{ij}=\phi_j^T z_i \quad (6)$$

Then, a probability distribution of the local features is estimated from a histogram having bins of predetermined sizes. It is assumed that the value of the k-th bin of the histogram obtained using the face-pattern samples is set to $W_+^k$, whereas the value of the k-th bin of the histogram obtained using the non-face pattern samples is set to $W_-^k$. A local feature $\phi_t$ which realizes the minimum value of a value in braces in formula (7) is extracted from the number M of local features. Note that each of the values of the histogram to be obtained here is a sum of the sample weights $d_i$ within a range of bins corresponding to the local features $u_{ij}$.

$$\phi_t = \operatorname{argmin}\{C_j \Sigma_k (\sqrt{W_+^k \cdot W_-^k})\} \quad (7)$$

Here, $C_j$ denotes a processing cost function for each of the local features and is represented by the following formula (8):

$$C_j = 1 + \frac{m_j}{2^l} \quad (8)$$

Here, $m_j$ denotes the area of each of the local regions, that is, the number of pixels. Furthermore, l denotes numbers of the strong discriminators connected to one another in series numbered from the one used in a first stage.

The statistic value of the number of activations for each of the strong discriminators in individual stages may be experimentally calculated, whereby a cost function may be defined using the product of the number of activations and a processing cost.

Accordingly, local features having a smaller area are likely to be selected. Furthermore, the smaller a value of l is, the greater the influence from the processing cost function to the processing of extracting patterns using a strong discriminator is. That is, a strong discriminator activated earlier is more greatly influenced by the processing cost function, and therefore, realizes discrimination with a less calculation cost. Meanwhile, since a strong discriminator having a large value of l is rarely activated, the processing of extracting patterns is less influenced by the processing cost function even if a processing cost thereof is large.

In addition, $\phi_t$ indicates a value of a feature extraction filter 308 of a t-th weak discriminator. The t-th weak discriminator outputs a value indicating the reliability of a subject to be discriminated, and the value represents a logarithmic ratio of a probability density (frequency of appearance) of face patterns defined by values of the local features to a probability density (frequency of appearance) of non-face patterns. That is, formula (9) is calculated for each of the bins and a table used for converting the local features into subject reliabilities is generated. Note that $\epsilon$ is a small constant used for avoiding divergence.

$$h_t = \frac{1}{2} \ln\left\{\frac{W_+^k + \varepsilon}{W_-^k + \varepsilon}\right\} \quad (9)$$

Note that instead of formula (7), according to "A Tip for Improving Vehicle Detector Using Rectangle Features Combined by AdaBoost", Proceedings of the 11th Symposium on Sensing via Image Information (2005), a value may be obtained by calculating formula (10):

$$h_t = \frac{1}{2} \ln\left\{\frac{W_+^k - W_-^k + \varepsilon}{W_+^k + W_-^k + \varepsilon}\right\} \quad (10)$$

In step S1005, the sample weights are updated in accordance with output values hti of the samples discriminated using the extracted weak discriminator. The update processing is performed in accordance with formula (11):

$$d_i = d_i \times \exp\{-y_i \cdot h_{ti}\} \quad (11)$$

Note that weights of samples not properly discriminated using the weak discriminator extracted using formula (5) are significantly updated whereas weights of samples discriminated properly are updated in a small degree. Accordingly, steps S1003 to S1005 are repeated to obtain a plurality of weak discriminators.

In step S1006, when a threshold value which causes an error in which a face pattern is determined to be a non-face pattern occurs with a rate of 1/1000 or less and an error in which a non-face pattern is determined to be a face pattern occurs with a rate of 1/2 or less is exist, the repetition of the processes from steps S1003 to S1005 is terminated.

When such a threshold value exists and the repetition of the processes from steps S1003 to S1005 is terminated, a middle value of a range of the threshold value is set as a threshold value 305. Furthermore, a limit value may be given to the number of times the steps S1003 to S1005 are repeated. When the repetition is terminated, the process proceeds to step S1007 where discrimination information is stored, and then the process is terminated.

Face discriminators configured in accordance with a method for generating discrimination information according to the present embodiment described above have the following characteristics:(1) Since weak discriminators are configured using a linear discriminant function, excellent performances thereof are attained. In addition, since an optimum linear discriminant function is recalculated every time a weight of a learning sample is updated, discrimination processing is performed effectively. Accordingly, strong discriminators each of which is formed by combination of the minimum number of weak discriminators and which exhibit high performances are obtained.(2) Since the weak discriminators are configured using the linear discriminant function, features (e.g., a diagonal edge) other than contrasts in the vertical direction and in the horizontal direction may be configured in accordance with sample patterns. Accordingly, an algorithm for calculating local features to be utilized for weak discriminators does not need to be changed for individual local regions subjected to discrimination processing.

In the previous embodiment, the table used for converting local features into subject reliabilities is obtained by a logarithmic ratio of a probability density (frequency of appearance) of face patterns defined by values of the local features to a probability density (frequency of appearance) of non-face patterns. Another embodiment described hereinafter employs another method for converting local features into subject reliabilities. The present embodiment is the same as the previous embodiment except for the method for converting local features into subject reliabilities.

Figure 15:
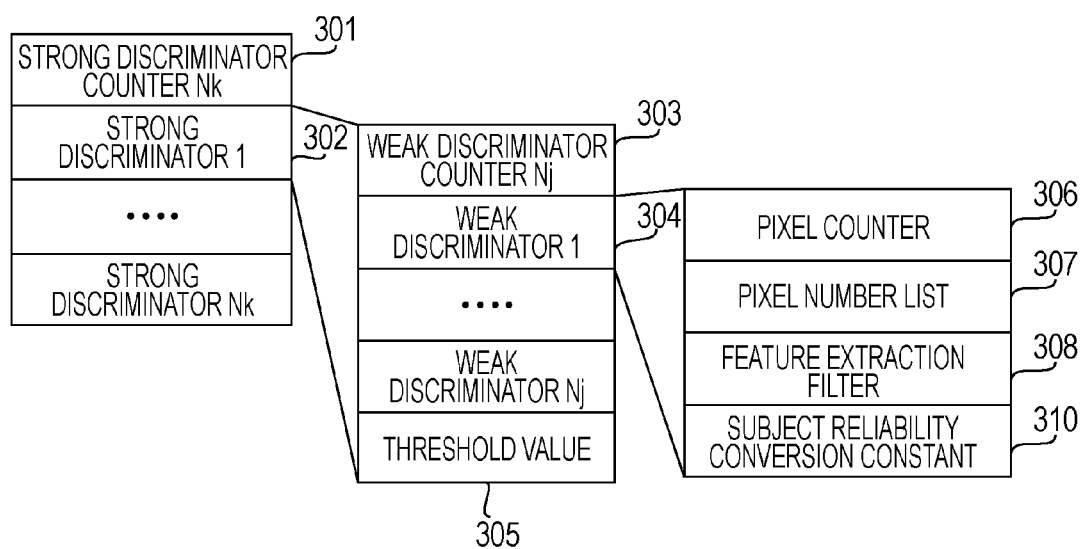
FIG. 15 is a diagram showing a data configuration of discriminator information according to a second embodiment.

FIG. 15 illustrates discriminator information stored in a discrimination information storage unit 70 of the present embodiment. The discriminator information in the present embodiment is different from that of the previous embodiment in that a subject reliability conversion constant 310 is employed instead of the subject reliability conversion look-up table 309 in the previous embodiment.

In the present embodiment, local features are converted into subject reliabilities as illustrated in formula (12):

$$f_{t,N}(U) = \alpha_{t,N} \, h_{t,N}(U) \quad (12)$$

where $$h_j(U) = \begin{cases} 1 & \text{if } p_j U < p_j Th_j \\ -1 & \text{otherwise} \end{cases} \quad (13)$$

Here, P stands a constant "1" or a constant "−1" for representing a sign, and p, α, and Th are stored in each of the subject reliability conversion constants 310 in the corresponding weak discriminators.

A method for generating discrimination information will now be described. A method for generating discrimination information in the present embodiment is the same as that in the previous embodiment, except for the processing in step S1004. Therefore, a method for extracting a weak discriminator performed in step S1004 and a method for obtaining the subject reliability conversion constant 310 will be described.

A value $\phi_t$ of local feature filter, $P_j$, and $Th_j$ which minimize a value $\tau_j$ of formula (14) are extracted from the number M of local features.

$$\tau_j = C_j \Sigma_i d_i |h_j(U_{i,j}) - y_i| \quad (14)$$

Here, $C_j$ denotes a processing cost function which is the same as that illustrated in formula (8).

Furthermore, $\alpha_t$ is obtained using formula (15):

$$\alpha_t = \log\left(\frac{1-\varepsilon_t}{\varepsilon_t}\right) \quad (15)$$

$$\varepsilon_t = \sum_i d_i |h_t(U_{i,t}) - y_i|$$

Here, formula (15) is different from a formula disclosed in "Rapid Object Detection using Boosted Cascade of Simple Features" in that a processing cost function is added to formula (15). Accordingly, local features having high performances are obtained while processing costs thereof are reduced.

Figure 16:
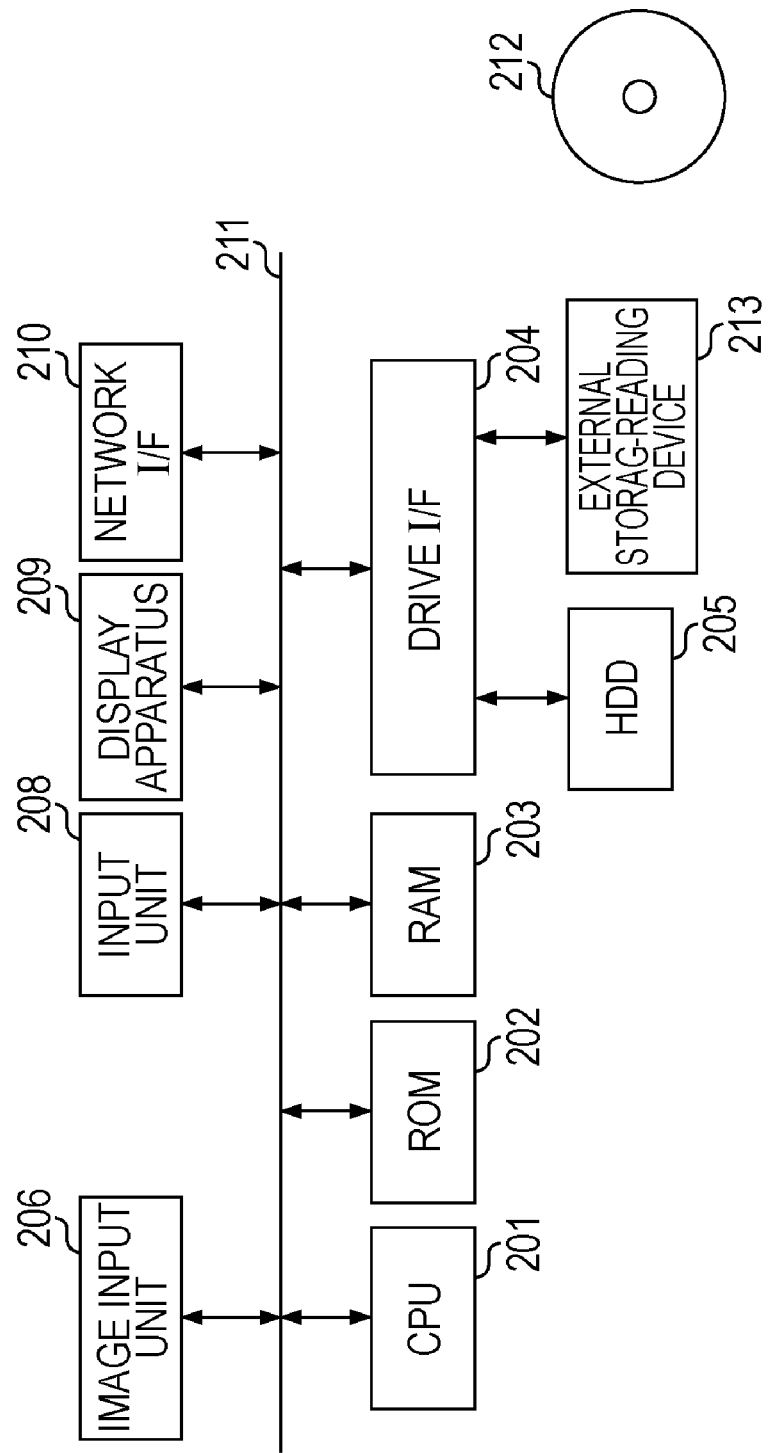
FIG. 16 a diagram showing a hardware configuration of an image processing apparatus according to a third embodiment.

FIG. 16 is a diagram illustrating a hardware configuration of an image processing apparatus according to still yet another embodiment. The same reference numerals are used for components having the same functions as those illustrated in FIG. 2.

The hardware configuration illustrated in FIG. 16 is different from that illustrated in FIG. 2 in that an external storage-reading device 213, such as a CD (compact disc)/DVD (digital versatile disc) drive, used for reading programs from an optical disc 212, such as a DVD or a CD, is connected to a drive I/F 204. The optical disc 212 stores programs for implementing the above-described embodiments.

When the optical disc 212 is inserted into the external storage-reading device 213, a CPU 201 reads the programs from the optical disc 212 and supplied to a RAM 203, whereby processing similar to that performed in the above-described embodiments is implemented.

According to the embodiments described above, a specific pattern is effectively detected with high accuracy from a given image. Particularly, use of local features which are effective for discrimination reduces the number of discriminators which are used in combination, and furthermore, high-accuracy discrimination is achieved. Moreover, in the case where a plurality of discriminators provided in different stages are used for discrimination processing, since a discriminator in a former stage uses a feature which needs a low calculation cost, the discrimination processing is performed at high speed.

In the above-described embodiments, a system for extracting a face pattern is described. However, the present invention is applicable to arbitrary object patterns other than the face patterns. For example, the present invention is applicable to extract patterns of entire human bodies, creatures, and vehicles. In the industrial field or in the field of distribution industry, the present invention is applicable to identification processing and inspection processing for products, components, and distribution products, for example.

The scope of the present invention also includes the case where software program code for implementing the features of the above-described embodiments is supplied to a computer (a CPU or a microprocessor unit (MPU)) of an apparatus or system connected to various devices such that the devices can be operated to implement the features of the above-described embodiments, and the devices are operated according to the program stored in the computer of the system or apparatus.

In this case, the software program code itself implements the features of the above-described embodiments, and the program code itself and a device for supplying the program code to the computer, such as a recording medium storing the program code, constitute an embodiment of the present invention. Recording media storing the program code include, but are not limited to, a floppy disk, a hard disk, an optical disk, a magneto-optical disk, a compact disk read-only memory (CD-ROM), a magnetic tape, a non-volatile memory card, and a ROM.

The features of the above-described embodiments are implemented by the computer executing the supplied program code. Further, in the case where the program code cooperates with an operating system (OS) running on the computer or other application software to implement the features of the above-described embodiments, the program code is included in an embodiment of the present invention.

The present invention may also include the case where the supplied program code is stored in a memory of a function expansion board of the computer, and thereafter a CPU included in the function expansion board executes part or the entirety of actual processing in accordance with an instruction of the program code, whereby the features of the above-described embodiments are implemented.

Further, the present invention may also include the case where the supplied program code is stored in a memory of a function expansion unit connected to the computer, and thereafter a CPU included in the function expansion unit executes part or the entirety of actual processing in accordance with an instruction of the program code, whereby the features of the above-described embodiments are implemented.

Examples of the above-described image input device include a camera employing CCD sensor, such as a video camera, a digital still camera, or a security camera, a scanner, and an image input device configured to receive digital images which were supplied from an analog image input device and were converted from analog images by AD (analog-digital) conversion processing. Examples of the above-described information storage device include an external hard disk and a video recorder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-203374 filed Jul. 26, 2006, which is hereby incorporated by reference herein in its entirety.

What is claimed is:

1. An image processing apparatus comprising:
a resizing unit configured to resize an input image into a plurality of images having different sizes;
an extraction unit configured to extract a pattern having a specific size as a pattern to be collated from each of the images having different sizes;
a resolution conversion unit configured to convert each of the patterns to be collated into collation patterns having different resolutions;
a subject reliability calculation unit configured to calculate a subject reliability of each local region in respective collation patterns having different resolutions, based on a local feature in the local region;
a discrimination unit configured to discriminate whether each of the collation patterns having different resolutions includes an image of a specific subject in accordance with the subject reliabilities of the local regions in respective collation patterns;
a determination unit configured to determine that the input image includes the image of the specific subject based on discrimination results by the discrimination unit with respect to the collation patterns having different resolutions converted from the images having different sizes; and
a processor configured to control at least one of the resizing unit, the extraction unit, the resolution conversion unit, the subject reliability calculation unit, the discrimination unit, and the determination unit.

2. The image processing apparatus according to claim 1, wherein the discrimination unit includes a plurality of discriminators connected to one another in series and arranged in a plurality of stages, wherein each of the discriminators performs a discrimination process by determining whether a supplied pattern includes a pattern representing a specific image of a subject in accordance with the subject reliabilities, and, for any two successive discriminators among the plurality of discriminators, a pattern which is determined to include the image of the specific subject by a former discriminator is supplied to a latter discriminator.

3. The image processing apparatus according to claim 2, wherein each of the discriminators is used to perform the discrimination process on a respective one of the local regions.

4. The image information apparatus according to claim 3, wherein each of the discriminators performs the discrimination process on one of the local regions selected based on a capability of discrimination of local features in the local regions, a stage number thereof counted from a first stage, and a calculation cost.

5. The image processing apparatus according to claim 2, wherein each of the plurality of discriminators includes a plurality of discrimination modules, and performs the discrimination process to determine whether the supplied pattern includes an image of the specific subject in accordance with results of discrimination processes performed using the plurality of discrimination modules.

6. The image processing apparatus according to claim 1, wherein the discrimination unit performs the discrimination processing by determining whether the collation pattern includes an image of the specific subject based on the sum of the subject reliabilities of the local regions.

7. The image processing apparatus according to claim 1, wherein the subject reliability calculation unit calculates a plurality of subject reliabilities of the local regions which are different with respect to at least one of sizes, forms, locations, and resolutions of the collation patterns.

8. The image processing apparatus according to claim 1, wherein the subject reliability calculation unit calculates subject reliabilities for individual local regions in accordance with a result of filter calculation for a plurality of local regions with a different resolutions based on at least one of a luminance value, color saturation, hue, and R component, G component, and B component in RGB color space.

9. The image processing apparatus according to claim 1, wherein the resizing unit converts the received image into a luminance image, and resizes the luminance image into a plurality of luminance images having different sizes.

10. The image processing apparatus according to claim 9, further comprising:
a luminance correction unit configured to normalize luminance of the collation patterns extracted from the plurality of luminance images having different sizes in accordance with luminance distribution.

11. A method for image processing, the method comprising:
resizing an input image into a plurality of images having different sizes;
extracting a pattern having a specific size as a pattern to be collated from each of the images having different sizes;
converting each of the patterns to be collated into collation patterns having different resolutions;
calculating, using a processor, a subject reliability of each local region in respective collation patterns having different resolutions, based on a local feature in the local region;
discriminating whether each of the collation patterns having different resolutions includes an image of a specific subject in accordance with the subject reliabilities of the local regions in respective collation patterns; and
determining that the input image includes the image of the specific subject based on discrimination results with respect to the collation patterns having different resolutions converted from the images having different sizes.

12. A non-transitory computer-readable storage medium storing a program that causes a computer to execute an image processing method according to claim 11.

* * * * *